United States Patent
Garcia Castro et al.

(10) Patent No.: US 11,608,393 B2
(45) Date of Patent: Mar. 21, 2023

(54) POLYMERIZATION PROCESS FOR LIQUID COPOLYMERS OF ETHYLENE AND HYDROXYALKYL(METH)ACRYLATE

(71) Applicant: BASF SE, Ludwigshafen am Rhein (DE)

(72) Inventors: Ivette Garcia Castro, Ludwigshafen (DE); Wolfgang Grabarse, Ludwigshafen (DE); Werner-Alfons Jung, Ascheberg (DE)

(73) Assignee: BASF SE, Ludwigshafen am Rhein (DE)

( * ) Notice: Subject to any disclaimer, the term of this patent is extended or adjusted under 35 U.S.C. 154(b) by 150 days.

(21) Appl. No.: 17/260,455

(22) PCT Filed: Jul. 17, 2019

(86) PCT No.: PCT/EP2019/069275
§ 371 (c)(1),
(2) Date: Jan. 14, 2021

(87) PCT Pub. No.: WO2020/016314
PCT Pub. Date: Jan. 23, 2020

(65) Prior Publication Data
US 2021/0301047 A1    Sep. 30, 2021

(30) Foreign Application Priority Data

Jul. 18, 2018 (EP) ..................... 18184180
Jul. 18, 2018 (EP) ..................... 18184185
Mar. 14, 2019 (EP) ..................... 19162842

(51) Int. Cl.
| | |
|---|---|
| C08F 2/38 | (2006.01) |
| C08F 220/20 | (2006.01) |
| C08F 210/02 | (2006.01) |
| C08F 220/16 | (2006.01) |
| C08F 220/10 | (2006.01) |
| C09D 123/08 | (2006.01) |
| C08F 220/18 | (2006.01) |

(52) U.S. Cl.
CPC ............. *C08F 2/38* (2013.01); *C08F 210/02* (2013.01); *C08F 220/10* (2013.01); *C08F 220/1808* (2020.02); *C08F 220/20* (2013.01); *C09D 123/0846* (2013.01); *C08F 220/16* (2013.01); *C08F 220/1804* (2020.02)

(58) Field of Classification Search
None
See application file for complete search history.

(56) References Cited

U.S. PATENT DOCUMENTS

| | | |
|---|---|---|
| 3,300,452 A | 1/1967 | Waples, Jr. |
| 6,384,170 B1 * | 5/2002 | Krull ........................ C10L 10/08 44/271 |
| 2013/0295289 A1 | 11/2013 | Littmann et al. |

FOREIGN PATENT DOCUMENTS

| | | | |
|---|---|---|---|
| EP | 0538033 A1 | 4/1993 | |
| GB | 1000330 A * | 8/1965 | ............ C08F 210/02 |
| GB | 1000330 A | 8/1965 | |

OTHER PUBLICATIONS

International Preliminary Report on Patentability received for PCT Patent Application No. PCT/EP2019/069275, dated Jan. 28, 2021, 8 pages.
International Search Report and Written Opinion received for PCT Patent Application No. PCT/EP2019/069275, dated Oct. 22, 2019, 9 pages.

* cited by examiner

*Primary Examiner* — Richard A Huhn
(74) *Attorney, Agent, or Firm* — Faegre Drinker Biddle & Reath LLP

(57) ABSTRACT

The present invention relates to a continuous high-pressure polymerization process for the preparation of a liquid ethylene copolymer which comprises in polymerized for methylene; and a reactive acrylate which is selected from hydroxyethyl (meth)acrylate, hydroxypropyl (meth)acrylate, and hydroxybutyl (meth)acrylate, where a monomer feed comprising the ethylene and the reactive acrylate is polymerized in the presence of at least 2 wt % of a chain transfer agent. The present invention also relates to the liquid ethylene copolymer, to a coating material comprising the liquid ethylene copolymer and to a use of the liquid ethylene copolymer to produce a coating material.

17 Claims, No Drawings

POLYMERIZATION PROCESS FOR LIQUID COPOLYMERS OF ETHYLENE AND HYDROXYALKYL(METH)ACRYLATE

CROSS-REFERENCE TO RELATED APPLICATIONS

This application is a national stage application (under 35 U.S.C. § 371) of PCT/EP2019/069275, filed Jul. 17, 2019 which claims benefit of European Application Nos. 18184180.0, filed Jul. 18, 2018, 18184185.9, filed Jul. 18, 2018, and 19162842.9, filed Mar. 14, 2019, all of which are incorporated herein by reference in their entirety.

The present invention relates to a continuous high-pressure polymerization process for the preparation of a liquid ethylene copolymer which comprises in polymerized form ethylene; and a reactive acrylate which is selected from hydroxyethyl (meth)acrylate, hydroxypropyl (meth)-acrylate, and hydroxybutyl (meth)acrylate, where a monomer feed comprising the ethylene and the reactive acrylate is polymerized in the presence of at least 2 wt % of a chain transfer agent. The present invention also relates to the liquid ethylene copolymer, to a coating material comprising the liquid ethylene copolymer and to a use of the liquid ethylene copolymer to produce a coating material. Combinations of preferred embodiments with other preferred embodiments are within the scope of the present invention.

Object was to find a polymerization process for the preparation of ethylene copolymers for coatings, which should overcome the drawbacks of the prior art. For example the process should be continuous, stable, well controlled, reliable, solvent-free or substantially solvent-free, scalable, or allow the production of the desired ethylene copolymer. The process should have a high space time yield, or a high acrylate content in the ethylene copolymer should be achievable. Preferably, several of these objects should be achieved.

Further objects were to find an ethylene copolymer obtainable by the polymerization process or to find a coating composition comprising the liquid ethylene copolymer which should overcome the drawbacks of the prior art. For example the ethylene copolymers should be liquid, should have a low pour point, should have a high degree of functionality. In particular, with regard to applicability of the copolymers in coating materials, the copolymerization process should be able to result in ethylene copolymers having high functionality and, especially, no or only low solvent content which, in turn, allows to prepare coating materials with high solid content. Accordingly, the ethylene copolymers, at a given solid content, should have a lower viscosity compared to standard resin components being known as binder components in coating materials, e.g. standard acrylate polymers.

The object was solved by a continuous high-pressure polymerization process for the preparation of a liquid ethylene copolymer which comprises in polymerized form
 ethylene; and
 a reactive acrylate which is selected from hydroxyethyl (meth)acrylate, hydroxypropyl (meth)acrylate, and hydroxybutyl (meth)acrylate,
where a monomer feed comprising the ethylene and the reactive acrylate is polymerized in the presence of at least 2 wt % of a chain transfer agent.

The object was also solved by the liquid ethylene copolymer. The object was also solved by a coating material comprising the liquid ethylene copolymer and by a use of the liquid ethylene copolymer to produce a coating material.

The polymerization process is a continuous process, which usually means that there is a continuous feed of starting materials (e.g. the monomer feed) and a continuous output of the polymeric product. The polymerization process may continue for at least 3 h, preferably at least 24 h, and in particular at least 72 h.

The polymerization process may be carried out in stirred high-pressure autoclaves, hereinafter also referred to as high-pressure autoclaves, or in high-pressure tube reactors, hereinafter also referred to as tube reactors. Preference is given to the high-pressure autoclaves, which may have a length/diameter ratio in the range from 5:1 to 30:1, preferably from 10:1 to 20:1.

The polymerization process may be carried out at a pressure in the range from 1000 to 4000 bar, preferably from 1200 to 2500 bar, and particularly 1600 to 2000 bar. Conditions of this type will hereinafter also be referred to as high-pressure. The pressure can change during the polymerization.

The polymerization process may be carried out at a reaction temperature in the range of 150 to 300° C., preferably 170 to 250° C., and in particular 190 to 230° C.

The monomer feed comprises the ethylene and the reactive acrylate and optionally the chain transfer agent and optionally the alkyl (meth)acrylate and optionally the further monomer.

The monomer feed is polymerized, wherein the ethylene and the reactive acrylate, and optionally the further monomer and optionally the chain transfer agent can be mixed before, during, or after entering the high-pressure autoclaves or the high-pressure tube reactors. Preferably, the monomer feed is polymerized, wherein the ethylene and the reactive acrylate and optionally the further monomer are mixed before entering the high-pressure autoclaves. Typically, the polymerization process takes place in the polymerization zone, which is usually inside the high-pressure autoclave or the high-pressure tube reactor.

Preferably, the monomer feed is free of the initiator.
Preferably, the monomer feed is free of the chain transfer agent.

The monomer feed may comprise the ethylene and the reactive acrylate and optionally the further monomer in amounts which are suitable to arrive at the desired monomer amounts in the ethylene copolymer.

Usually, the monomer feed comprises at least 30 wt %, preferably at least 40 wt %, and in particular at least 50 wt % of ethylene, where the percentage is based on all monomers present in the monomer feed. In another form, the monomer feed comprises 30-90 wt %, preferably 40-80 wt %, and in particular 50-70 wt % of ethylene. In another form, the monomer feed comprises 40-95 wt %, preferably 60-90 wt %, and in particular at least 70-85 wt % of ethylene.

Usually, the monomer feed comprises at least 10 wt %, preferably at least 25 wt %, and in particular at least 35 wt % of reactive acrylate, where the percentage is based on all monomers present in the monomer feed. In another form the monomer feed comprises at least 5 wt %, preferably at least 8 wt %, and in particular at least 12 wt % of reactive acrylate, where the percentage is based on all monomers present in the monomer feed. In another form, the monomer feed comprises 10-70 wt %, preferably 20-60 wt %, and in particular 30-50 wt % of the reactive acrylate. In another form, the monomer feed comprises 5-60 wt %, preferably 8-45 wt %, and in particular 12-35 wt % of the reactive acrylate.

The percentage of all monomers (e.g. ethylene, the reactive acrylate and the further monomer) in the monomer feed usually sum up to 100%.

In another form the monomer feed comprises at least 30 wt % (e.g. at least 35, 40, 45, 50, 55, or 60 wt %) ethylene and at least 20 wt % (e.g. at least 25, 30, 35, 40 wt %) of the reactive acrylate. In another form the monomer feed comprises at least 50 wt % (e.g. at least 55, 60, 65, or 70 wt %) ethylene and at least 5 wt % (e.g. at least 8, 10, 12 or 15 wt %) of the reactive acrylate.

In another form the monomer feed comprises up to 90 wt % (e.g. up to 85, 80, 75, 70, or 65 wt %) ethylene and up to 70 wt % (e.g. up to 65, 60, 55, 50, 45, or 40 wt %) of the reactive acrylate. In another form the monomer feed comprises up to 95 wt % (e.g. up to 90, 85, 80, or 75 wt %) ethylene and up to 60 wt % (e.g. up to 55, 50, 45, 40, or 35 wt %) of the reactive acrylate.

In another form the monomer feed comprises 30-90 wt % ethylene, 10-70 wt % of the reactive acrylate, and optionally up to 20 wt % of further monomers, where the percentages of the monomers sum up to 100%. In another form the monomer feed comprises 40-80 wt % ethylene, 20-60 wt % of the reactive acrylate, and optionally up to 10 wt % of further monomers, where the percentages of the monomers sum up to 100%. In another form the monomer feed comprises 40-90 wt % ethylene, 5-60 wt % of the reactive acrylate, and optionally up to 40 wt % of further monomers, where the percentages of the monomers sum up to 100%. In another form the monomer feed comprises 50-90 wt % ethylene, 5-50 wt % of the reactive acrylate, and optionally up to 30 wt % of further monomers, where the percentages of the monomers sum up to 100%.

The conversion of the ethylene is usually around 15-70 wt %, preferably 25-55 wt % and in particular 30-45 wt %, based on the ethylene feed.

The input (e.g. kg monomer feed per hour) and the output (e.g. kg ethylene copolymer per hour) of the polymerization process depend on the size of the equipment. For example, a 1 liter auto-clave may allow an input 6-25 kg/h monomer feed, or an output of 3-8 kg/h ethylene copolymer.

In a preferred form of the polymerization process the monomer feed is passed in the presence of the chain transfer agent at a temperature within the range from about 20 to 50° C., for example of 30° C., preferably continuously, into a stirred autoclave which is maintained at a pressure in the range from about 1200 to 2500 bar. The preferably continuous addition of initiator which is generally dissolved in a suitable solvent, for example isododecane or methylethylketone, keeps the temperature in the reactor at the desired reaction temperature, for example at from 150 to 280° C. The polymer obtained after the decompression of the reaction mixture may be then isolated. Modifications to this method are of course possible and can be undertaken by those skilled in the art without unreasonable effort. For example, the monomers and the chain transfer agent can also be separately added into the reaction mixture using suitable pumps, or the reaction temperature can be varied during the process.

The percentage of the chain transfer agent can be based on the sum of the amounts of monomers (e.g. ethylene, the reactive acrylate, optionally the further monomers) and the chain transfer agent. For example, a monomer feed of 15 kg/h ethylene and 3 kg/h acrylate and a feed of the chain transfer agent of 2 kg/h corresponds to the presence of 10 wt % of the chain transfer agent.

The monomer feed comprising the ethylene and the reactive acrylate is polymerized in the presence of at least 2 wt %, preferably at least 5 wt %, and in particular at least 8 wt % of the chain transfer agent, e.g. in the polymerization zone. In another form the monomer feed comprising the ethylene and the reactive acrylate may be polymerized in the presence of at least 2.1 wt %, or at least 2.3 wt %, or at least 2.5 wt %, or at least 3.0 wt %, or at least 3.5 wt %, or at least 4.0 wt %, or at least 4.5 wt %, or at least 5.0 wt %, or at least 5.5 wt %, or at least 6.0 wt %, or at least 6.5 wt %, or at least 7.0 wt %, or at least 8 wt %, or at least 9 wt %, or at least 10 wt % of the chain transfer agent.

In another form the monomer feed comprising the ethylene and the reactive acrylate may be polymerized in the presence of up to 30 wt %, preferably up to 20 wt %, and in particular up to 15 wt % of the chain transfer agent.

In another form the monomer feed comprising the ethylene and the reactive acrylate may be polymerized in the presence of 4 to 18 wt %, preferably 6 to 15 wt %, and in particular 9 to 13 wt % of the chain transfer agent. In another form the monomer feed comprising the ethylene and the reactive acrylate may be polymerized in the presence of 5 to 28 wt %, preferably 7 to 23 wt %, and in particular 9 to 20 wt % of the chain transfer agent.

In another form the monomer feed comprising the ethylene and the reactive acrylate may be polymerized in the presence of 3.0 to 12 wt %, preferably 3.5 to 10 wt %, and in particular 4.0 to 8 wt % of the chain transfer agent.

Suitable chain transfer agents (also named regulator) in the sense of this invention are regulators which are terminating the growing of a polymer being incorporated as terminus of the polymer chain. Suitable regulators are saturated or unsaturated hydrocarbons, alcohols, thiols, ketones, aldehydes, amines, or hydrogen.

Among saturated and unsaturated hydrocarbons the chain transfer agents can be selected from pentane, hexane, cyclohexane, isododecane, propene, butene, pentene, cyclohexene, hexene, octene, decen and dodecen, and from aromatic hydrocarbonds such as toluol, xylol, trimethyl-benzene, ethylbenzene, diethylbenzene, triethylbenzene, mixtures thereof.

Suitable ketones or aldehydes as chain transfer agents are aliphatic aldehydes or aliphatic ketones, such as regulators of the formula II

(II)

or mixtures thereof.

$R_a$ and $R_b$ are the same or different and are selected from
  hydrogen;
  $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl such as methyl, ethyl, n-propyl, isopropyl, n-butyl, isobutyl, sec-butyl and tert-butyl;
  $C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R_a$ and $R_b$ radicals may also be covalently bonded to one another to form a 4- to 13-membered ring. For example, $R_a$ and $R_b$ together may form the following alkylene groups:

—$(CH_2)_4$—, —$(CH_2)_6$—, —$(CH_2)_6$—, —$(CH_2)_7$—, —CH(CH$_3$)—CH$_2$—CH$_2$—CH(CH$_3$)— or —CH(CH$_3$)—CH$_2$—CH$_2$—CH$_2$—CH(CH$_3$)—.

Preferred ketones as chain transfer agents are acetone, methylethylketone, diethylketone and diamylketone.

Preferred aldehydes as chain transfer agents are acetaldehyde, propionaldehyde, butanal and pentanal.

Among alcohols the chain transfer agents are selected from the group consisting of methanol, ethanol, propanol, isopropanol, butanol and pentanol.

Among thiols the chain transfer agents maybe selected from mercaptoethanol to tetradecanthiol. In another form suitable thiols are organic thio compounds, such as primary, secondary, or tertiary aliphatic thiols, such as, ethanethiol, n-propanethiol, 2-propanethiol, n-butanethiol, tert-butanethiol, 2-butanethiol, 2-methyl-2-propanethiol, n-pentanethiol, 2-pen-tanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate.

Among amines the chain transfer agents are selected from primary, secondary, or tertiary amines, such as dialkyl amines or trialkyl amines. Examples for amines are propyl amine, dipropyl amine, dibutyl amine, triethyl amine.

Preferred chain transfer agents are saturated or unsaturated hydrocarbons, aliphatic ketones, aliphatic aldehydes, or hydrogen, or mixtures thereof.

In another preferred form the chain transfer agents are propene, butene, pentene, propionaldehyde, methylethylketone, isododecane, or hydrogen, or mixtures thereof.

In another preferred form the chain transfer agents are propionaldehyde, methyl ethyl ketone, or hydrogen, or mixtures thereof.

In another preferred form the chain transfer agents are mixtures of propionaldehyde and/or methylethylketone and/or hydrogen.

In another preferred form the chain transfer agents is propionaldehyde. In another preferred form the chain transfer agents is a mixture of propionaldehyde and methylethylketone. The weight ratio of propionaldehyde to methylethylketone may be in the range from from 4:1 to 1:4, preferably from 3.5:1 to 1:3.0, in particular from 2.8:1 to 1:2.5

The monomer feed comprising the ethylene and the reactive acrylate may be polymerized in the presence of at least 2.5 wt %, or at least 3.0 wt %, or at least 3.5 wt %, or at least 4.0 wt %, or at least 4.5 wt %, or at least 5.0 wt %, or at least 5.5 wt %, or at least 6.0 wt %, or at least 6.5 wt %, or at least 7.0 wt %, or at least 8 wt %, or at least 9 wt %, or at least 10 wt % of the chain transfer agent selected from mixture of propionaldehyde and methylethylketone.

The chain transfer agents can be diluted with suitable solvents (e.g. hydrocarbons), preferably they are used without additional solvents.

The polymerization process is usually a free-radical polymerization, and usually initiated by an initiator. Suitable initiators are organic peroxides, oxygen or azo compounds. Mixtures of a plurality of free-radical initiators are also suitable.

Suitable peroxides are didecanoyl peroxide, 2,5-dimethyl-2,5-di(2-ethylhexanoylperoxy)hexane, tert-amyl peroxypivalate, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbonyl)cyclohexane as isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropylcarbonate, 2,2-di(tert-butylperoxy)butane or tert-butyl peroxacetate; tert-butyl peroxybenzoate, di-tert-amyl peroxide, dicumyl peroxide, the isomeric di-(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butylperoxide, 1,3-diisopropylbenzene monohydroperoxide, cumene hydroperoxide or tert-butyl hydro-peroxide, or dimeric or trimeric ketone peroxides.

As azo compound azodicarboxylic esters, azodicarboxylic dinitriles are suitable, mention may be made by way of example of azobisisobutyronitrile ("AIBN").

Preferred initiators are selected from the group consisting of di-tert-butyl peroxide, tert-amyl peroxypivalate, tert-butyl peroxypivalat, tert-butyl peroxyisononanoate, tert-butyl peroxy-2-ethylhexanoate, 2,2-di(tert-butylperoxy)butane and mixtures thereof. Preferably tert-amyl peroxypivalate is used as initiator.

Initiators, e.g. organic peroxides, are often admixed with solvents to make them easier to handle. In a preferred form the initiator is introduced in the form of a solution in one or more ketone(s) or hydrocarbons (especially olefins) which are liquid at room temperature. The initiator are preferably fed in as a 0.1-50% strength by weight solution, preferably a 0.5-20% strength by weight solution, in one or more hydrocarbons or one or more ketone(s) which are liquid at room temperature or mixtures of hydrocarbons (e.g. olefins or aromatic hydrocarbons such as toluene, ethylbenzene, ortho-xylene, meta-xylene and para-xylene, also cycloaliphatic hydrocarbons such as cyclohexane and aliphatic $C_6$-$C_{16}$-hydrocarbons, either branched or unbranched, for example n-heptane, n-octane, isooctane, n-decane, n-dodecane and in particular isododecane), ketones (e.g. acetone, methyl isobutyl ketone, ethyl methyl ketone). In cases where the solvents for the initiator are also function as regulators (e.g. ketones), then the amount of such regulator is included for calculating the wt % of the regulator in the monomer feed.

The amount of the initiator depends on the chemical nature of the initiator and can by adjusted by routine experiments. Typically, the initiator is present in 0,001 to 0.1 wt %, preferably 0.01 to 0.05 wt % based on the weight of the monomer feed.

The initiators employed herein can be introduced into the polymerization zone in any suitable manner, for example, by dissolving the initiator in a suitable solvent and injecting the initiator solution directly into the polymerization zone. Alternatively, the initiator may be injected into the feed stream, either into the ethylene feed stream or the reactive acrylate feed stream, prior to introduction thereof into the polymerization zone. The initiator can, for example, be fed in at the beginning, in the middle or after one third of the tube reactor. Initiator can also be fed in at a plurality of points on the tube reactor. In the autoclave it can be fed either in one point in the middle or twice: first in the upper part of the reactor and the second time either in the middle or in the bottom of the reactor. In addition three or more injections are possible.

The more preferable way to add monomers, chain transfer agent and solvents and other components in the process is mixing those together with ethylene in the middle pressure zone of 200-300 bar, in order to increase the homogeneity of the mixtures of ethylene with the other components (called mixing within the compressor). Besides there is the possibility to add all liquids (chain transfer agents, monomers, solvents) directly to the high pressure zone of 1000-2200 bar; after the compression of ethylene (called mixing outside of the compressor). In addition both ways to add the liquids components can be used simultaneously.

The polymerization process may be followed by postpolymerization chemical reactions, such as a hydrogenation. The hydrogenation may be a homogeneous or heterogenous catalytic hydrogenation. Usually, the hydrogenation is achieved with molecular hydrogen in the presence of a transition metal catalyst (e.g. based on Rh, Co, Ni, Pd, or Pt), which may be dissolved in solvents or supported on inorganic supports.

The ethylene copolymer is liquid, which usually means that it is liquid at room temperature, e.g. at 25° C.

The ethylene copolymers are usually not crystalline, so that in general no crystallization commencement temperature, $T_{CC}$, is measurable at T>15° C. with differential scanning calorimetry. Usually, a melt flow index cannot be determined with ethylene copolymers.

The ethylene copolymer may have a pour point below 25° C., preferably below 20° C., and in particular below 15° C. In another form the ethylene copolymer may have a pour point below 10° C., preferably below 5° C., and in particular below 0° C. The pour point may be determined according to ASTM D 97. In one form the ethylene copolymer is considered liquid when its pour point is below 25° C., preferably below 20° C., and in particular below 15° C. The ethylene copolymer may be clear liquid at room temperature, e.g. at 25° C. Typically, in a clear liquid no turbidity is visible.

The ethylene copolymer may have a cloud point of below 25° C., preferably below 20° C., and in particular below 15° C. The cloud point may be determined according to ISO 3015.

The ethylene copolymer may be miscible with a polyalphaolefine having a kinematic viscosity at 100° C. of about 6 cSt. This miscibility may be determined in a weight ratio of 50:50 at room temperature, e.g. 25° C. for 24 h.

The ethylene copolymer may have a viscosity index of at least 100, preferably at least 120, and in particular of at least 180. The viscosity index may be determined according to ASTM D2270.

The ethylene copolymer may have a kinematic viscosity at 40° C. from 200 to 30 000 mm$^2$/s (cSt), preferably from 500 to 10 000 mm$^2$/s, and in particular from 1000 to 5000 mm$^2$/s. The kinematic viscosity may be determined according to ASTM D445.

In another form the ethylene copolymer may have a kinematic viscosity at 40° C. from 700 to 4000 mm$^2$/s (cSt), preferably from 1000 to 3000 mm$^2$/s, and in particular from 1200 to 2500 mm$^2$/s.

In another form the ethylene copolymer may have a kinematic viscosity at 40° C. from 5000 to 50 000 mm$^2$/s (cSt), preferably from 10 000 to 35 000 mm$^2$/s, and in particular from 15 000 to 30 000 mm$^2$/s.

The ethylene copolymer may have a kinematic viscosity at 100° C. from 10 to 5000 mm$^2$/s (cSt), preferably from 30 to 3000 mm$^2$/s, and in particular from 50 to 2000 mm$^2$/s In another form the ethylene copolymer may have a kinematic viscosity at 100° C. from 50 to 500 mm$^2$/s (cSt), preferably from 80 to 350 mm$^2$/s, and in particular from 100 to 200 mm$^2$/s.

In another form the ethylene copolymer may have a kinematic viscosity at 100° C. from 200 to 3000 mm$^2$/s (cSt), preferably from 700 to 2500 mm$^2$/s, and in particular from 800 to 2100 mm$^2$/s.

The ethylene copolymer may have a kinematic viscosity at 120° C. from 20 to 5000 mm$^2$/s (cSt), preferably from 70 to 3000 mm$^2$/s, and in particular from 100 to 2700 mm$^2$/s The ethylene copolymer has usually a weight-average molecular weight $M_w$ in the range up to 35 000 g/mol, preferably up to 30 000 g/mol, and in particular up to 25 000 g/mol. In another form the ethylene copolymer has usually a weight-average molecular weight $M_w$ in the range up to 20 000 g/mol, preferably up to 50 000 g/mol, and in particular up to 10 000 g/mol.

In another form the ethylene copolymer has usually a weight-average molecular weight $M_w$ in the range from 1000 to 30 000 g/mol, preferably from 1500 to 25 000 g/mol, and in particular from 3000 to 25000 g/mol. In another form the ethylene copolymer has usually a weight-average molecular weight $M_w$ in the range from 1 000 to 25 000 g/mol, preferably from 2 000 to 20 000 g/mol, and in particular from 3000 to 15 000 g/mol. In another form the ethylene copolymer has usually a weight-average molecular weight Mw in the range from 8 000 to 35 000 g/mol, preferably from 10 000 to 30 000 g/mol, and in particular from 12 000 to 25 000 g/mol. In another form the ethylene copolymer has usually a weight-average molecular weight $M_w$ in the range from 1000 to 20 000 g/mol, preferably from 3000 to 15 000 g/mol, and in particular from 5000 to 10 000 g/mol.

The ethylene copolymer has usually a number-average molecular weight $M_n$ in the range up to 12000 g/mol, preferably up to 10000 g/mol, and in particular up to 7000 g/mol. In another form the ethylene copolymer has usually a number-average molecular weight $M_n$ in the range up to 8000 g/mol, preferably up to 6000 g/mol, and in particular up to 5000 g/mol.

In another form the ethylene copolymer has usually a number-average molecular weight $M_n$ in the range from 1000 to 12000 g/mol, preferably from 1200 to 9000 g/mol, and in particular from 1500 to 7000 g/mol. The Mw and Mn may be determined by GPC on calibrated columns.

In another form the ethylene copolymer has usually a number-average molecular weight $M_n$ in the range from 1000 to 10000 g/mol, preferably from 1500 to 8000 g/mol, and in particular from 1700 to 5000 g/mol.

In another form the ethylene copolymer has usually a number-average molecular weight $M_n$ in the range from 2000 to 15 000 g/mol, preferably from 3500 to 10 000 g/mol, and in particular from 4000 to 7000 g/mol.

The ethylene copolymer has usually a polydispersity ($M_w/M_n$) of at least 1, preferably in the range from 1.3 to 5, more preferably from 1.5 to 4, and most preferably from 1.8 to 3.8.

In another form the ethylene copolymer has usually a polydispersity in the range from 1.3 to 3.5, more preferably from 1.5 to 3.3, and most preferably from 1.9 to 3.0. In another form the ethylene copolymer has usually a polydispersity in the range from 1.4 to 2.8, more preferably from 1.7 to 2.6, and most preferably from 1.9 to 2.4.

In another form the ethylene copolymer has usually a polydispersity in the range from 2.7 to 4.5, more preferably from 3.0 to 4.0, and most preferably from 3.2 to 3.8.

The liquid ethylene copolymer may comprise in polymerized form 20 to 80 wt %, preferably 25 to 75 wt %, and in particular 30 to 70 wt % of ethylene. In another form the liquid ethylene copolymer may comprise in polymerized form 20 to 60 wt %, preferably 25 to 55 wt %, and in particular 30 to 50 wt % of ethylene. In another form the liquid ethylene copolymer may comprise in polymerized form at least 10, 20, 30, 40, 50, 60 or 70 wt % of ethylene. In another form the liquid ethylene copolymer may comprise in polymerized form up to 20, 30, 40, 50, 60, 70 or 80 wt % of ethylene.

In another form the liquid ethylene copolymer comprises in polymerized form 40 to 97 mol %, preferably 55 to 94 mol %, and in particular 67 to 91 mol % of ethylene. In another form the liquid ethylene copolymer comprises in polymerized form 35 to 95 mol %, preferably 45 to 40 mol %, and in particular 55 to 88 mol % of ethylene. In another form the liquid ethylene copolymer comprises in polymerized form at least 35, 40, 45, 50, 55, 60, 65, 70, 75, 80, 85 or 90 mol % of ethylene.

The reactive acrylate is selected from hydroxyethyl (meth)acrylate, hydroxypropyl (meth)acrylate, and hydroxybutyl (meth)acrylate. In another form the reactive acrylate is selected from hydroxyethyl acrylate, hydroxyethyl methacrylate, hydroxypropyl acrylate, hydroxypropyl methacrylate, hydroxybutyl acrylate and hydroxybutyl methacrylate. In another form the reactive acrylate is selected from hydroxyethyl methacrylate, hydroxypropyl methacrylate, and hydroxybutyl methacrylate. In another form the reactive acrylate is selected from hydroxyethyl acrylate and hydroxyethyl methacrylate. Mixtures of hydroxyethyl (meth)acrylate, hydroxypropyl (meth)acrylate, and/or hydroxybutyl (meth)acrylate are also possible.

The liquid ethylene copolymer may comprise in polymerized form more than 2 wt %, preferably more than 8 wt %, and in particular more than 10 wt % of the reactive acrylate (e.g. selected from hydroxyethyl acrylate and hydroxyethyl methacrylate). The ethylene copolymer may comprise in polymerized form 3 to 70 wt %, preferably 5 to 55 wt %, and in particular 11 to 40 wt % of the reactive acrylate (e.g. selected from hydroxyethyl acrylate and hydroxyethyl methacrylate). In another form the ethylene copolymer may comprise in polymerized form 3 to 60 wt %, preferably 5 to 50 wt %, and in particular 7 to 45 wt % of the reactive acrylate (e.g. selected from hydroxyethyl acrylate and hydroxyethyl methacrylate). In another form the liquid ethylene copolymer comprises in polymerized form at least 2, 4, 6, 8, 10, 11, 12, 13, 15, 18, 20, 25, 30, or 35 wt % of the reactive acrylate (e.g. selected from hydroxyethyl acrylate and hydroxyethyl methacrylate). In another form the liquid ethylene copolymer comprises in polymerized form less than 80, 70, 60, 50, or 40 wt % of the reactive acrylate.

In another form the liquid ethylene copolymer may comprise in polymerized form at least 1 mol %, preferably at least 2 mol %, and in particular at least 4 mol % of the reactive acrylate. In another form the liquid ethylene copolymer may comprise in polymerized form less than 10, 15, 20, 25, 30, 35, 40, or 45 mol % of the reactive acrylate. In another form the ethylene copolymer may comprise in polymerized form 1 to 20 mol %, preferably 2 to 15 mol %, and in particular 4 to 12 mol % of the reactive acrylate.

The ethylene copolymer may comprise in polymerized form an alkyl (meth)acrylate which is selected from $C_1$-$C_{22}$ alkyl (meth)acrylate, preferably from $C_1$-$C_{12}$ alkyl (meth) acrylate, and in particular from $C_1$-$C_6$ alkyl (meth)acrylate, or mixtures thereof. In another form the ethylene copolymer may comprise in polymerized form an alkyl (meth)acrylate which is selected from $C_1$-$C_{18}$ alkyl (meth)acrylate, preferably from $C_1$-$C_{14}$ alkyl (meth)acrylate, and in particular from $C_1$-$C_8$ alkyl (meth)acrylate, or mixtures thereof.

In a preferred form the alkyl (meth)acrylate is selected from methyl (meth)acrylate, ethyl (meth)acrylate, n-propyl (meth)acrylate, and n-butyl (meth)acrylate, or mixtures thereof. In another preferred form the alkyl (meth)acrylate is selected from methyl methacrylate, and n-butyl acrylate, or mixtures thereof. In another preferred form the alkyl (meth) acrylate is selected from methyl (meth)acrylate, ethyl (meth) acrylate, n-propyl (meth)acrylate, n-butyl (meth)acrylate, $C_6$-$C_{14}$ alkyl (meth)acrylates (e.g. 2-ethylhexyl (meth)acrylate) or mixtures thereof. The term "(meth)acrylate" refers to esters of acrylic acid, methacrylic acid, or mixtures thereof.

The alkyl group of the alkyl (meth)acrylate may be saturated or unsaturated (preferably saturated), branched, cyclic or linear (preferably linear or branched) or mixtures thereof, such as methyl, ethyl, n-propyl, isopropyl, n-butyl, isobutyl, sec-butyl, tert-butyl, n-pen-tyl, isopentyl, sec-pentyl, neopentyl, 1,2-dimethylpropyl, isoamyl, n-hexyl, isohexyl, sec-hexyl, cyclo-hexyl, n-heptyl, n-octyl, isooctyl, 2-ethylhexyl, n-nonyl, 2-propylheptyl, n-decyl, un-decyl, dodecyl, tridecyl, tetradecyl, pentadecyl, hexadecyl, heptadecyl, octadecyl, 2-butyloctyl, 2-pentylnonyl, 2-hexyldecyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl, and mixtures thereof.

In a particular form the alkyl (meth)acrylate is selected from methyl (meth)acrylate. In another particular form the alkyl (meth)acrylate is selected from n-butyl (meth)acrylate. In another particular form the alkyl (meth)acrylate is selected from 2-ethylhexyl (meth)acrylate.

In another preferred form the ethylene copolymer is free of the alkyl (meth)acrylate.

The liquid ethylenes copolymer may comprise in polymerized form at least 10 wt %, preferably at least 20 wt %, and in particular at least 25 wt % of the alkyl (meth)acrylate (e.g. $C_1$-$C_{12}$ alkyl (meth)acrylate). The ethylene copolymer may comprise in polymerized form 15 to 70 wt %, preferably 20 to 65 wt %, and in particular 25 to 60 wt % of the alkyl (meth)acrylate. In another form the ethylene copolymer may comprise in polymerized form 30 to 80 wt %, preferably 40 to 75 wt %, and in particular 50 to 75 wt % of the alkyl (meth)acrylate. In another form the ethylene copolymer may comprise in polymerized form 5 to 70 wt %, preferably 10 to 65 wt %, and in particular 15 to 60 wt % of the alkyl (meth)acrylate (e.g. $C_1$-$C_{12}$ alkyl (meth)acrylate). In another form the liquid ethylene copolymer comprises in polymerized form less than 80, 75, 70, 65, 60, 20, 19, 18, 16, 15 wt % of the alkyl (meth)acrylate. In another form the liquid ethylene copolymer comprises in polymerized form at least 10, 12, 14, 16, 18, 22, 24, 26, 28, 30, 40, or 45 wt % of the alkyl (meth)acrylate. In another form the ethylene copolymer may comprise in polymerized form least 20 wt % or less than 20 wt % (e.g. 1 to 19 wt %, or 5 to 19 wt %) of the alkyl (meth)acrylate.

In another form the liquid ethylene copolymer may comprise in polymerized form at least 5 mol %, preferably at least 10 mol %, and in particular at least 15 mol % of the alkyl (meth)-acrylate. In another form the liquid ethylene copolymer may comprise in polymerized form less than 25, 30, 35, 40, or 45 mol % of the alkyl (meth)acrylate. In another form the ethylene copolymer may comprise in polymerized form 5 to 40 mol %, preferably 10 to 35 mol %, and in particular 15 to 30 mol % of the alkyl (meth)acrylate. In another form the ethylene copolymer may comprise in polymerized form 5 to 50 mol %, preferably 10 to 45 mol %, and in particular 15 to 40 mol % of the alkyl (meth)acrylate.

In case the alkyl (meth)acrylate is present in the ethylene copolymer then the monomer feed usually comprises the ethylene, the reactive acrylate, the alkyl (meth)acrylate, and optionally the chain transfer agent and optionally the further monomer.

In another preferred form the ethylene copolymer is free of the alkyl (meth)acrylate.

The wt % or the mol % of the monomers, which are present in polymerized form in the ethylene copolymer, usually refers to the total amount of monomers which are present in polymerized form in the ethylene copolymer. Other compounds, such as radical starters or chain transfer agents, may be incorporated in the ethylene copolymer, but they are usually not considered for this calculation.

Usually, the sum of the wt % of ethylene and the reactive acrylate and optionally the alkyl (meth)acrylate and optionally the further monomer is up to 100 wt %, preferably 80 to 100 wt %, in particular 95 to 100 wt %. In another form the sum of the wt % of ethylene and the reactive acrylate is 100 wt %. Usually, the sum of the mol % of ethylene and the reactive acrylate and optionally the alkyl (meth)acrylate and optionally the further monomer is up to 100 mol %, preferably 80 to 100 mol %, in particular 95 to 100 mol %. In another form the sum of the wt % of ethylene and the reactive acrylate is 100 mol %.

The wt % or the mol % of the monomers in the ethylene copolymer may be determined by H-NMR.

In another form the ethylene copolymer comprises (preferably consists of) in polymerized form
15 to 55 wt % of ethylene,
5 to 65 wt % of the reactive acrylate, which is selected from hydroxyethyl (meth)acrylate, hydroxypropyl (meth)acrylate, and hydroxybutyl (meth)acrylate, and
10 to 50 wt % of the alkyl (meth)acrylate, which is selected from $C_1$-$C_6$ alkyl (meth)acrylate.

In another form the ethylene copolymer comprises (preferably consists of) in polymerized form
15 to 55 wt % of ethylene,
5 to 65 wt % of the reactive acrylate, which is selected from hydroxyethyl (meth)acrylate, hydroxypropyl (meth)acrylate, and hydroxybutyl (meth)acrylate, and
10 to 60 wt % of the alkyl (meth)acrylate, which is selected from $C_1$-$C_{12}$ alkyl (meth)acrylate.

In another form the ethylene copolymer comprises (preferably consists of) in polymerized form
20 to 50 wt % of ethylene,
10 to 55 wt % of the reactive acrylate, which is selected from hydroxyethyl (meth)acrylate and hydroxypropyl (meth)acrylate, and
15 to 45 wt % of the alkyl (meth)acrylate, which is selected from $C_1$-$C_6$ alkyl (meth)acrylate.

In another form the ethylene copolymer comprises (preferably consists of) in polymerized form
20 to 50 wt % of ethylene,
5 to 55 wt % of the reactive acrylate, which is selected from hydroxyethyl (meth)acrylate and hydroxypropyl (meth)acrylate, and
15 to 60 wt % of the alkyl (meth)acrylate, which is selected from $C_1$-$C_8$ alkyl (meth)acrylate.

In another form the ethylene copolymer comprises (preferably consists of) in polymerized form
20 to 50 wt % of ethylene,
10 to 50 wt % of the reactive acrylate, which is selected from hydroxyethyl (meth)acrylate, and
15 to 45 wt % of the alkyl (meth)acrylate, which is selected from n-butyl acrylate.

In another form the ethylene copolymer comprises (preferably consists of) in polymerized form
20 to 60 wt % of ethylene,
the reactive acrylate which is selected from hydroxyethyl (meth)acrylate, hydroxypropyl (meth)acrylate, and hydroxybutyl (meth)acrylate, and
at least 20 wt % or less than 20 wt % (e.g. 1 to 19 wt %, or 5 to 19 wt %) of the alkyl (meth)acrylate.

In another form the continuous high-pressure polymerization process is for the preparation of the liquid ethylene copolymer which comprises in polymerized form
20 to 60 wt % of ethylene;
the reactive acrylate which is selected from hydroxyethyl (meth)acrylate, hydroxypropyl (meth)acrylate, and hydroxybutyl (meth)acrylate; and
at least 20 wt % of the alkyl (meth)acrylate, which is selected from $C_1$-$C_{22}$ alkyl (meth)acrylate,
where the monomer feed comprising the ethylene, the reactive acrylate and the alkyl (meth)acrylate is polymerized in the presence of at least 2 wt % of a chain transfer agent.

The ethylene copolymer may comprise in polymerized form further monomers beside ethylene, the reactive acrylate, and the alkyl (meth)acrylate, such as up to 10 wt %, preferably up to 4 wt %, and in particular up to 2 wt % of all monomers. Preferably, the ethylene copolymer is free of further monomers beside the ethylene and the reactive acrylate and the alkyl (meth)acrylate. In another form the ethylene copolymer may comprise less than 2 wt %, preferably less than 1 wt %, and in particular less than 0.3 wt % of the further monomers. In another form the ethylene copolymer may comprise in polymerized form less than 2 mol %, preferably less than 1 mol %, and in particular less than 0.5 mol % of the further monomers.

Examples for further monomers are
vinyl aromatic compounds, such as styrene, alpha-methyl styrene, vinyl toluene or p-(tert-butyl) styrene;
acrylamide and methacrylamide;
maleic acid and the imides and $C_1$ to $C_{14}$-alkyl or di alkyl esters thereof;
fumaric acid and the imides and $C_1$ to $C_{14}$-alkyl or di alkyl esters thereof;
itaconic acid and the imides and $C_1$ to $C_{10}$-alkyl esters thereof;
acrylonitrile and methacrylonitrile;
acrylates and methacrylates with functionalized chain such as dimethylaminoethyl methacrylate, dimethylaminopropyl methacrylate, diethylaminoethyl methacrylate, diethylaminopropyl methacrylate, dimethylaminoethyl acrylate, dimethylaminopropyl acrylate, diethylaminoethyl acrylate, diethylaminopropyl acrylate, tert-butylaminoethyl methacrylate, glycidyl methacrylate, phenoxyethyl acrylate, phenoxyethyl methacrylate, 2-morpholinoethyl methacrylate;
acrylamide derivatives such as as N,N-dimethylaminopropyl methacrylamide, N,N-dimethylaminopropyl acrylamide, N,N-dimethylacrylamide, N,N-diethylacrylamide;
vinyl derivatives such as vinylimidazol, vinylpyrrolidone, vinylformamide, vinylethers, propylvinylether, butylvinylether and cyclohexylvinylether.

Other suitable further monomers are $C_{24}$-$C_{40}$ alkyl(meth)acrylates, which are preferably branched, such as (meth)acrylates of 2-decyl-tetradecanol, 2-dodecyl-hexadecanol, tetradecyl-octadecanol.

Other suitable further monomers are polyolefin-based macromonomers, preferably the macromonomers according to WO 2018/024563, such as macromonomers of the following formula (III)

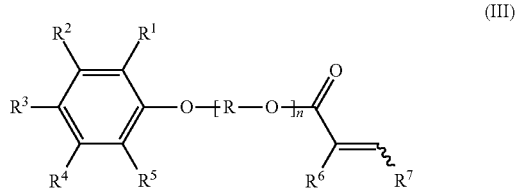

(III)

wherein $R^1$ to $R^5$ are each independently selected from the group consisting of H, $C_1$-$C_{20}$-Alkyl, $C_1$-$C_{20}$-Alkyloxy and $C_8$-$C_{3500}$-Polyisobutyl and $C_8$-$C_{3500}$-Polyisobutenyl,
R is a 2 to 10 carbon atoms comprising alkylene group,
$R^6$ is hydrogen or methyl,
$R^7$ is hydrogen, methyl or COORS,
$R^8$ is hydrogen or $C_1$-$C_{20}$-alkyl, and
n is a positive integer from 1 to 50,
with the provisio that at least of of the residues $R^1$ to $R^5$ is a $C_8$-$C_{3500}$-polyisobutyl or $C_8$-$C_{3500}$-polyisobutenyl.

In another form the further monomers are non-ionic monomers.

In another form the ethylene copolymer may be free of further monomers which are vinylester of the formula (I) in polymerized form

(I)

where $R^c$, $R^d$, and $R^e$ are each independently H or $C_1$-$C_4$-alkyl, and $R^f$ is $C_1$-$C_{20}$ alkyl. A suitable vinyl ester of the formula (I) is vinyl acetate. In another form the ethylene copolymer comprises less than 2 mol %, less than 1.5 mol %, less than 1.0 mol %, less than 0.5 mol % or less than 0.1 mol % of the vinylester of the formula (I), such as vinyl acetate. In another form the ethylene copolymer may be free of vinyl derivatives such as vinylester.

In another form the ethylene copolymer may be free of further monomers in polymerized form, which comprise a functional group, such as a functional group selected from carboxylic acid, sulfonic acid, phosphonic acid, amino, amide, imide, and cyano. In another form the ethylene copolymer may comprise less than 5 wt %, preferably less than 1 wt %, and in particular less than 0.5 wt % further monomers in polymerized form, which comprise a functional group. In another form the ethylene copolymer may comprise in polymerized form less than 2 mol %, preferably less than 1 mol %, and in particular less than 0.5 mol % further monomers in polymerized form, which comprise a functional group.

In another form the ethylene copolymer may be free of further monomers which are vinylester of the formula (I) in polymerized form, and of further monomers in polymerized form, which comprise functional groups.

In another form the ethylene copolymer is free of further monomers in polymerized form, which comprise an ionic group (e.g. anionic, cationic, or zwitter ionic), such as a carboxylic acid, sulfonic acid, or phosphonic acid. In another form the ethylene copolymer may comprise less than 5 wt %, preferably less than 1 wt %, and in particular less than 0.5 wt % further monomers in polymerized form, which comprise an ionic group.

In another form the ethylene copolymer is free of further monomers in polymerized form, which comprise an acidic group, such as maleic acid, fumaric acid, itaconic acid, acrylic acid, and methacrylic acid. In another form the ethylene copolymer may comprise less than 5 wt %, preferably less than 1 wt %, and in particular less than 0.5 wt % further monomers in polymerized form, which comprise an acidic group, such as maleic acid, fumaric acid, itaconic acid, acrylic acid, and methacrylic acid. In another form the ethylene copolymer is free of acrylic acid and/or methacrylic acid in polymerized form. In another form the ethylene copolymer may comprise less than 5 wt %, preferably less than 1 wt %, and in particular less than 0.5 wt % of acrylic acid and/or methacrylic acid in polymerized form.

The present invention further relates to the liquid ethylene copolymer. The liquid ethylene polymer is obtainable, preferably it is obtained by the inventive polymerization process.

The present invention further relates to a coating material comprising the liquid ethylene copolymer.

The present invention further relates to a use of the the liquid ethylene copolymer to produce a coating material, preferably a coating material for single-coat or multicoat clearcoats and/or colour and/or effect coating systems.

Preferably, the coating material is used for automotive OEM finishing, automotive refinishing, or the coating of commercial vehicles.

EXAMPLES

NBA: N-butyl acrylate
MMA: Methyl methacrylate
EHA: 2-Ethylhexyl acrylate, commercially available from BASF SE
HEMA: Hydroxyethyl methacrylate
Preparation of Copolymers A high-pressure autoclave, of the type described in the literature (M. Buback et al, *Chem. Ing. Tech.* 1994, 66, 510-513) was used for continuous copolymerization Ethylene was fed continuously into a first compressor until approx. 250 bar. Separately from this, the amount of HEMA and the alkyl (meth)acrylate (NBA, MMA or EHA) was also compressed continuously to an intermediate pressure of 250 bar and was mixed with the ethylene fed. The ethylene/acrylate mixture was further compressed using a second compressor. The reaction mixture is brought to a 1 liter autoclave with pressure and temperatures given also according to Table 1. The desired temperature is controlled depending on the amount of initiator tert-amyl peroxypivalate in isodecane, which is introduced to the autoclave separately from the monomer feed (about 1000-1500 ml/h).

Separately from this, the amount of chain transfer agent (cf. Table 1 "Regulator Feed") was first compressed to an intermediate pressure of 250 bar and then fed continuously into the high-pressure autoclave with the aid of a further compressor under the reaction pressure.

The output of the reactions in Table 1 was usually around 5-6 kg/h at a conversion of 30 to 45 wt % (based on ethylene feed). Details of the reaction conditions were summarized in Table 1 and the analytical data of the liquid ethylene copolymers are summarized in Table 2.

TABLE 1

Preparation of liquid ethylene copolymers
(PA: propionaldehyde, MEK: methylethylketone)

| Ex. | Monomers | P [bar] | T [° C.] | Ethylene Feed [g/h] | AcrylateFeed | Regulator Feed |
|---|---|---|---|---|---|---|
| 1 | E-HEMA-NBA | 1800 | 200 | 12010 | HEMA: 560 g/h (6.9 wt %) NBA: 2990 g/h | PA: 1200 g/h MEK: 560 g/h (3.2 wt %) |
| 2 | E-HEMA-NBA | 1802 | 203 | 12000 | HEMA: 1755 g/h (6.5 wt %) NBA: 1770 g/h | PA: 1200 g/h MEK: 1755 g/h (9.5 wt %) |
| 3 | E-HEMA-NBA | 1802 | 201 | 12130 | HEMA: 1860 g/h (6.2 wt %) NBA: 2240 g/h | PA: 1200 g/h MEK: 1860/h (9.6 wt %) |
| 4 | E-HEMA-NBA | 1800 | 202 | 11965 | HEMA: 1000 g/h (6.7 wt %) NBA: 2700 g/h | PA: 1200 g/h MEK: 1000 g/h (5.6 wt %) |
| 5 | E-HEMA-MMA | 1796 | 202 | 12015 | HEMA: 1685 g/h (6.6 wt %) MMA: 1695 g/h | PA: 1200 g/h MEK: 1685 g/h (9.2 wt %) |
| 6 | E-HEMA-MMA | 1795 | 201 | 12030 | HEMA: 1993 g/h (6.2 wt %) MMA: 2200 g/h | PA: 1200 g/h MEK: 1933 g/h (10.0 wt %) |
| 7 | E-HEMA-MMA | 1794 | 200 | 12070 | HEMA: 2175 g/h (6.4 wt %) MMA: 1100 g/h | PA: 1200 g/h MEK: 2175 g/h (11.6 wt %) |
| 8 | E-HEMA-MMA | 1795 | 201 | 12090 | HEMA: 2653 g/h (5.9 wt %) MMA: 1600 g/h | PA: 1200 g/h MEK: 2653 g/h (13.1 wt %) |
| 9 | E-HEMA-MMA | 1795 | 200 | 11985 | HEMA: 520 g/h (7.0 wt %) MMA: 3000 g/h | PA: 1200 g/h MEK: 520 g/h (3.0 wt %) |
| 10 | E-HEMA-MMA | 1800 | 200 | 12025 | HEMA: 1017 g/h (6.6 wt %) MMA: 3000 g/h | PA: 1200 g/h MEK: 1017 g/h (5.6 wt %) |
| 11 | E-HEMA-EHA | 1801 | 201 | 12030 | HEMA: 1700 g/h (6.5 wt %) EHA: 1700 g/h | PA: 1200 g/h MEK: 1700 g/h (9.3 wt %) |
| 12 | E-HEMA-EHA | 1800 | 200 | 12035 | HEMA: 1905 g/h (6.2 wt %) EHA: 2200 g/h | PA: 1200 g/h MEK: 1905 g/h (9.9 wt %) |
| 13 | E-HEMA-EHA | 1800 | 200 | 12060 | HEMA: 2200 g/h (6.4 wt %) EHA: 1100 g/h | PA: 1200 g/h MEK: 2200 g/h (11.7 wt %) |
| 14 | E-HEMA-EHA | 1800 | 200 | 12090 | HEMA: 2300 g/h (6.2 wt %) EHA: 1600 g/h | PA: 1200 g/h MEK: 2300 g/h (11.8 wt %) |
| 15 | E-HEMA-EHA | 1796 | 200 | 12035 | HEMA: 490 g/h (7.0 wt %) EHA: 3000 g/h | PA: 1200 g/h MEK: 490 g/h (2.8 wt %) |
| 16 | E-HEMA-EHA | 1798 | 200 | 12045 | HEMA: 992 g/h (6.6 wt %) EHA: 3000 g/h | PA: 1200 g/h MEK: 992 g/h (5.4 wt %) |

Characterization of the Liquid Ethylene Copolymers

The molecular weight number distribution Mn and the molecular weight weight distribution Mw were determined via GPC. The polydispersity was calculated as PD=(Mw/Mn). The GPC analysis was made with a RI detector, a PLgel MIXED-B column (column temperature 35° C.) and THF with 0.1% trifluor acetic acid as elution medium. The calibration was done with very narrow distributed polystyrene standards from the Polymer Laboratories with a molecular weights M=from 580 until 6.870.000 g/mol.

The amounts of monomomers which are present in polymerized form in the polymer was determined by H-NMR. The Kinematic Viscosity at 120° C. (V120) were determined according to ASTM D 445. The appearance of the liquid ethylene copolymers was determined visually. The Cloud Point CP was determined according to ISO 3015. The Pour Point PP was determined according to ASTM D 97.

The results demonstrated that all ethylene copolymers were liquid at room temperature and had a pour point below 25° C. The results further indicate that all ethylene copolymers tend to have good low temperature characteristics because of their low cloud point. The results demonstrated that the ethylene copolymers have a desired high kinematic viscosity and is liquid at room temperature.

TABLE 2

Analytical data of copolymers

| Ex. | Monomers | Amounts [wt%] | Mn [g/mol] | Mw [g/mol] | PD | V120 [mm$^2$/s] |
|---|---|---|---|---|---|---|
| 1 | E-HEMA-NBA | 35-12-53 | 4090 | 8820 | 2.2 | 220 |
| 2 | E-HEMA-NBA | 38-34-28 | 3120 | 7 020 | 2.3 | 400 |
| 3 | E-HEMA-NBA | 34-34-32 | 3370 | 7 790 | 2.3 | 460 |
| 4 | E-HEMA-NBA | 35-21-44 | 3630 | 8 450 | 2.3 | 295 |
| 5 | E-HEMA-MMA | 39-30-31 | 2780 | 6190 | 2.2 | 1130 |
| 6 | E-HEMA-MMA | 35-30-35 | 2940 | 6690 | 2.3 | 1710 |
| 7 | E-HEMA-MMA | 40-40-20 | 2580 | 5660 | 2.2 | 855 |
| 8 | E-HEMA-MMA | 37-40-23 | 2760 | 6150 | 2.2 | 1410 |
| 9 | E-HEMA-MMA | 35-10-55 | 3290 | 7490 | 2.3 | 2035 |
| 10 | E-HEMA-MMA | 34-18-48 | 3290 | 7540 | 2.3 | 2504 |
| 11 | E-HEMA-EHA | 41-32-27 | 2720 | 6090 | 2.2 | 275 |
| 12 | E-HEMA-EHA | 36-32-32 | 2930 | 6880 | 2.3 | 330 |
| 13 | E-HEMA-EHA | 42-40-18 | 2870 | 5910 | 2.1 | 360 |
| 14 | E-HEMA-EHA | 41-37-22 | 2850 | 5950 | 2.1 | 300 |
| 15 | E-HEMA-EHA | 38-10-52 | 3090 | 7000 | 2.3 | 140 |
| 16 | E-HEMA-EHA | 36-18-46 | 3130 | 7160 | 2.3 | 200 |

The invention claimed is:

1. A continuous high-pressure polymerization process for the preparation of a liquid ethylene copolymer which comprises in polymerized form
    ethylene;
    a reactive acrylate which is selected from hydroxyethyl (meth)acrylate, hydroxypropyl (meth)acrylate, and hydroxybutyl (meth)acrylate, and
    an alkyl (meth)acrylate which is selected from $C_1$-$C_{22}$ alkyl (meth)acrylate;
wherein a monomer feed comprising the ethylene and the reactive acrylate is polymerized in the presence of at least 2 wt % of a chain transfer agent.

2. The polymerization process according to claim 1, wherein the chain transfer agents are saturated or unsaturated hydrocarbons, aliphatic ketones, aliphatic aldehydes, or hydrogen, or mixtures thereof.

3. The polymerization process according to claim 1, wherein the chain transfer agents are propionaldehyde, methyl ethyl ketone, or hydrogen, or mixtures thereof.

4. The polymerization process according to claim 1, wherein the monomer feed is polymerized in the presence at least 8 wt % of the chain transfer agent.

5. The polymerization process according to claim 1, wherein the chain transfer agent is a mixture of propionaldehyde and methyl ethyl ketone in a weight ratio of 4:1 to 1:4.

6. The polymerization process according to claim 1, wherein the polymerization process is carried out at a pressure in the range from 1000 to 4000 bar.

7. The polymerization process according to claim 1, wherein the polymerization process is carried out at a pressure in the range from 1200 to 2500 bar.

8. The polymerization process according to claim 1, wherein the polymerization process is carried out at a pressure in the range from 1600 to 2000 bar.

9. The polymerization process according to claim 1, wherein the ethylene copolymer comprises in polymerized form 20 to 60 wt % of the ethylene.

10. The polymerization process according to claim 1, wherein the ethylene copolymer comprises in polymerized form more than 2 wt % of the reactive acrylate.

11. The polymerization process according to claim 1, wherein the ethylene copolymer comprises in polymerized form at least 10 wt % of the alkyl (meth)acrylate.

12. The polymerization process according to claim 1, wherein the alkyl (meth)acrylate is selected from $C_1$-$C_{12}$ alkyl (meth)acrylate.

13. The polymerization process according to claim 1, wherein the ethylene copolymer comprises from 15 to 70 wt % of the alkyl (meth)acrylate.

14. The polymerization process according to claim 1, wherein the ethylene copolymer is free of further monomers beside the ethylene, the reactive acrylate, and the alkyl (meth)acrylate.

15. A liquid ethylene copolymer produced by the process as defined in claim 1.

16. A coating material comprising the liquid ethylene copolymer as defined in claim 15.

17. A continuous high-pressure polymerization process for the preparation of a liquid ethylene copolymer which comprises in polymerized form ethylene; and a reactive acrylate which is selected from hydroxyethyl (meth)acrylate, hydroxypropyl (meth)acrylate, and hydroxybutyl (meth)acrylate, wherein a monomer feed comprising the ethylene and the reactive acrylate is polymerized in the presence of at least 2 wt % of a chain transfer agent and wherein the chain transfer agent is a mixture of propionaldehyde and methyl ethyl ketone in a weight ratio of 4:1 to 1:4.

* * * * *